No. 715,430. Patented Dec. 9, 1902.
F. A. SEIBERLING.
DETACHABLE PNEUMATIC TIRE.
(Application filed Mar. 12, 1902.)

(No Model.)

WITNESSES: Frank A. Seiberling INVENTOR.

UNITED STATES PATENT OFFICE.

FRANK A. SEIBERLING, OF AKRON, OHIO.

DETACHABLE PNEUMATIC TIRE.

SPECIFICATION forming part of Letters Patent No. 715,430, dated December 9, 1902.

Application filed March 12, 1902. Serial No. 97,855. (No model.)

*To all whom it may concern:*

Be it known that I, FRANK A. SEIBERLING, a citizen of the United States, residing at Akron, in the county of Summit and State of Ohio, have invented a certain new and useful Improvement in Detachable Pneumatic Tires, of which the following is a specification.

My invention has a general relation to improvements in detachable pneumatic tires for bicycles, automobiles, and similar vehicles, wherein an inner air-tube furnishes the elastic cushion for the vehicles and an outer protecting-shield is used to prevent punctures of the air-tube, and has especial relation to the peculiar manner by which the outer protecting-shield is fastened in place.

This tire when prepared in accordance with my invention is peculiarly adapted to rest in the curved rim of a metallic suspension-wheel and is so constructed that it can be readily and securely placed in position in the rim of the wheel and quickly and easily removed.

To the accomplishment of the aforesaid objects my invention consists in certain peculiarities of construction and combination of parts hereinafter described and then specifically pointed out in the claims, reference being had to the accompanying drawings, which form a part of this specification.

Figure 1:
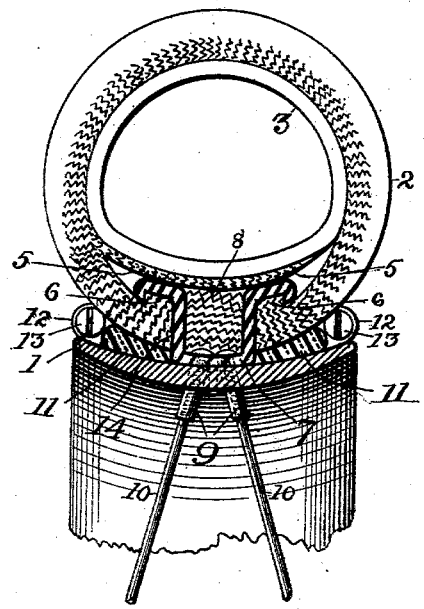
Figure 2:
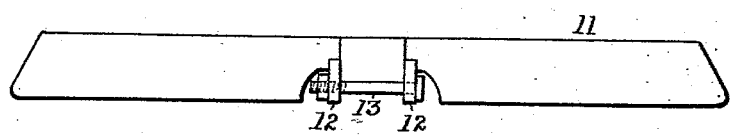

In the accompanying drawings, in which similar reference-numerals indicate like parts in both figures, Figure 1 is a section of a metallic tire provided with my improved rubber tire and associated and connected parts, and Fig. 2 a side elevation of one of the retaining-bands hereinafter described.

In the drawings, 1 is the rim of a suspension-wheel, preferably of metal, concave on its outer periphery. Fastened centrally in this concave rim by rivets or other desired or preferred means is a locking device 7 for holding the tire, which consists of substantially a U-shaped iron with the tops flaring outwardly and then downwardly into hook-like sides. Through the lower portion of the U-shaped locking device 7 and also through the rim 1 of the wheel are drilled at preferred intervals holes for the heads or nuts 9 of the spokes 10 of the wheel. The open space above the heads or nuts 9 in the U-shaped locking device 7 is then filled with any suitable or preferred substance. If it is not desired to fill this opening 8, a plate of metal 5 may be laid across the upright ends of the locking device and the space 8 may be left vacant. Immediately and centrally above the locking device 7 is placed the inner air-tube 3, which may be of the ordinary construction of air-tubes, and about the tube 3 is placed the shield 2, which is constructed of rubber and a series of layers of rubber-saturated fabric. This outer shield is commonly, but not necessarily, constructed on what is known as a "drum," and when taken therefrom is rolled by hand or otherwise into a tube-like condition. It is then placed over the air-tube 3 and its edges forced under the downwardly-turned hooked sides of the locking device 7, the idea being to enable the locking device to engage the shield on its inner surface and to permit these hook-like sides to perform their function from substantially the vertical center of the wheel.

In case it is not desired to use the concave plate of metal 5 a protecting-cover of saturated fabric is placed across the upper faces of the U-shaped locking-iron 7 to prevent abrasion of the inner air-tube 3.

In order to force the edges of the shield 2 into perfect engagement with the locking device 7, I place on each side of the locking-iron 7 a metallic band 11, preferably wedge-shaped in section and with the thinner portion toward the vertical center of the wheel. The opposite ends of this band have ears 12, in which are perforations to receive binding-bolts 13, by which means the ends of the bands may be drawn toward one another to any suitable tension. As the bands 11 are drawn taut by the bolts 13 the tendency will be to force them toward the vertical center of the concave rim 1, which will in turn force upward the sides of the shell 2 into engagement with the hooked sides of the iron 7, by which a retaining-ridge 6 is produced in the shield 2, thus affording a simple but secure fastening for the entire tire. When it is desired to remove the tire, it is accomplished by reversing the operation, beginning with releasing the bands 12 by means of the bolts 13.

Should it be desired to replace a spoke of the wheel, the tire is lifted off, the filler 8, if that is used, is removed, and the spoke replaced. If the filler 8 is not used, the metallic plate 5 is removed and the spoke replaced. The tire is then placed on the wheel, as described.

Having thus described my invention, what I claim, and desire to secure by Letters Patent, is—

1. The herein-described tire of the class specified which consists of an endless inner tube, an outer envelop, severed longitudinally on one side, in combination with a metallic concave rim, a U-shaped outwardly-open metallic trough with outwardly and downwardly turned sides, with its base secured lengthwise of said rim, and binding-rings, wedge-shaped in section resting between said rim and envelop, and means for contracting said rings, substantially as shown and described.

2. The combination with the concave rim of a suspension-wheel of a metal trough with outwardly and downwardly turned edges, said rim and trough having diverging holes to register, with tubular nuts passing through said holes to unite said trough and rim and receive the wheel-spokes, with a continuous pneumatic tube, and an envelop to inclose it with its edges arranged to rest in said concave rim, and metallic bands, wedge-shaped in section to rest between said rim and envelop, and means as bolts and screws to contract said bands, substantially as shown and described.

3. The combination with a concave wheel-rim, of a longitudinal trough secured immovably therein with diverging and downwardly-turned edges, a continuous cover to form a bed for an endless inflatable tube upon said trough, an inflatable tube on said cover, an envelop to inclose said tube and bed and a pair of bands for compressing the edges of said envelop against said trough, substantially as shown and described.

4. The combination with a concave metallic wheel-rim of an annular metallic band secured substantially centrally therein with oppositely-divergent, and downwardly-turned flanges, an endless inflatable tire to rest on said flanges, a longitudinally-severed envelop to inclose said tire, and bands tapered to an edge, to compress the edges of said envelop under said flanges, and devices as bolts and nuts to contract said bands, substantially as shown and described.

In testimony that I claim the above I hereunto set my hand in the presence of two subscribing witnesses.

FRANK A. SEIBERLING.

In presence of—
C. E. HUMPHREY,
C. P. HUMPHREY.